(12) United States Patent
Li et al.

(10) Patent No.: US 9,720,997 B2
(45) Date of Patent: Aug. 1, 2017

(54) METHOD AND APPARATUS FOR PRIORITIZING METADATA

(71) Applicant: THOMSON LICENSING, Issy de Moulineaux (FR)

(72) Inventors: Hui Li, Hannover (DE); Michael Weber, Hannover (DE); Stefan Kubsch, Hohnhorst (DE); Klaus Gaedke, Hannover (DE)

(73) Assignee: THOMSON LICENSING, Issy-les Moulineaux (FR)

( * ) Notice: Subject to any disclaimer, the term of this patent is extended or adjusted under 35 U.S.C. 154(b) by 705 days.

(21) Appl. No.: 13/934,611

(22) Filed: Jul. 3, 2013

(65) Prior Publication Data

US 2014/0012850 A1    Jan. 9, 2014

(30) Foreign Application Priority Data

Jul. 5, 2012  (EP) .................................... 12305805

(51) Int. Cl.
*G06F 7/00* (2006.01)
*G06F 17/30* (2006.01)

(52) U.S. Cl.
CPC .. *G06F 17/30598* (2013.01); *G06F 17/30743* (2013.01); *G06F 17/30784* (2013.01)

(58) Field of Classification Search
CPC ............... G06F 17/30; G06F 17/30598; G06F 17/30743; G06F 17/30784
See application file for complete search history.

(56) References Cited

U.S. PATENT DOCUMENTS

| | | | |
|---|---|---|---|
| 7,444,357 B2 | 10/2008 | Shin | |
| 7,463,290 B2 | 12/2008 | Tojo et al. | |
| 7,620,633 B1 | 11/2009 | Parsons et al. | |
| 8,752,192 B2 | 6/2014 | Odaka et al. | |
| 2004/0037183 A1* | 2/2004 | Tanaka | G11B 27/329 369/47.16 |
| 2007/0263818 A1* | 11/2007 | Sumioka | H04L 29/06027 379/201.01 |
| 2009/0125602 A1* | 5/2009 | Bhatia | H04L 51/26 709/207 |
| 2010/0161570 A1 | 6/2010 | Novak et al. | |
| 2011/0058787 A1* | 3/2011 | Hamada | G11B 27/10 386/224 |
| 2012/0170721 A1* | 7/2012 | Yoakum | H04M 1/7255 379/88.11 |
| 2012/0240112 A1* | 9/2012 | Nishiguchi | G06F 9/45558 718/1 |

FOREIGN PATENT DOCUMENTS

| | | |
|---|---|---|
| EP | 2608059 | 6/2013 |
| WO | WO2009047674 | 4/2009 |

OTHER PUBLICATIONS

EP Search Report dated Nov. 30, 2012.

* cited by examiner

*Primary Examiner* — Azam Cheema

(57) ABSTRACT

A method and an apparatus for prioritizing a metadata item associated to audio or video data are described. A metadata item is retrieved from a metadata repository or via an input. An analyzing unit determines a priority value of the metadata item using one of a plurality of prioritization methods. A storing unit then stores the priority value in a priority table and references the priority table in a metadata table.

6 Claims, 3 Drawing Sheets

| ... | SegmentStart | SegmentEnd | SegmentDuration | SegmentPriority (flag) | ... |
|---|---|---|---|---|---|
| | | | | 1 | |
| | | | | | |

Fig. 1

| ... | SegmentStart | SegmentEnd | SegmentDuration | SegmentPriority (string) | ... |
|---|---|---|---|---|---|
| | | | | xxxA | |
| | | | | | |

Fig. 2

| UUID | NumberOfMethods | MethodsTracking | DefaultPriority | UserPriority |
|---|---|---|---|---|
| xxxA | 4 | UUID-123 | xx3 | xx4 |
| | | | | |

Fig. 3

| UUID | TrackingID | MethodsTracking | ProcessType | PriorityValue |
|---|---|---|---|---|
| xx1 | UUID-123 | (Method 1) | original | ... |
| Xx2 | UUID-123 | (Method 2) | original | ... |
| Xx3 | UUID-123 | (Joe Bloggs 1) | post-edit | ... |
| Xx4 | UUID-123 | (Joe Bloggs 2) | post-edit | ... |

Fig. 4

METHOD AND APPARATUS FOR PRIORITIZING METADATA

This application claims the benefit, under 35 U.S.C. §119 of European Patent Application 12305805.9, filed Jul. 5, 2012.

FIELD OF THE INVENTION

The invention relates to a method and an apparatus for prioritizing metadata, and more specifically to a method and an apparatus for prioritizing metadata associated to audio or video data based on an analysis of priority variables. The invention further relates to a method and an apparatus for annotating audio or video data.

BACKGROUND OF THE INVENTION

Today huge amounts of data are available in libraries, archives and databases. Digitalization and metadata, i.e. data about data, have simplified the use of these data. During digitization or content analysis different metadata extracting methods are used to extract and save these metadata to an internal metadata repository. With the help of metadata, the underlying data can be accessed efficiently. However, with the increasing number of available methods for extracting metadata, the amount of metadata in the repositories increases accordingly. This enormous increase of metadata amount somewhat decreases the efficiency for data access. How to raise the metadata quality has thus become more and more important. The daily increasing amount of digital audio and video content poses new challenges for content management systems in digital film and video archives. Therefore, authoring tools that can access and edit audio and video content efficiently are required. One approach for tackling the problem is the description of the contents of the audio and video files with the help of semantically linked metadata, and the use of this type of metadata for effective management of the huge data sets. Browsing through content or search and retrieval of specific content can be realized very efficiently by applying semantically linked metadata. Semantically linked metadata is a kind of qualified metadata. Also various types of recommendations for similar content can be realized with semantically linked metadata.

Nonetheless, also with semantically linked metadata there the overall amount of metadata associated to an audio or video file is too large for certain applications. For example, for the semantic annotation and linking work for a video file archivists would prefer to have a tool that can efficiently limit the amount of metadata that is presented. To give an example, a face detection algorithm detects all faces in a video regardless of how relevant the detected faces are for a semantic description of the content. Typically, in a news program roughly about 5% of the detected faces are relevant for the semantic annotation and linking work. Therefore, it would greatly increase the efficiency and usability of a manual semantic annotation and linking tool if only the relevant elements were presented to the user in a graphical user interface. A key aspect of such a tool is hence a prioritization of semantic metadata regarding their probable relevance to the semantic description of the video data.

A solution for prioritizing metadata has been proposed in European Patent Application 11306747.4, where prioritization values are automatically determined by combining specific characteristics of independently generated semantic metadata. According to this solution, a method for determining priority values of metadata items of a first set of metadata items associated to a video data item, the first set of metadata items being of a first type, comprises the steps of:
retrieving the first set of metadata items;
retrieving a second set of metadata items associated to the video data item, the second set of metadata items being of a second type different from the first type;
calculating one or more of a plurality of predetermined priority variables for the first set of metadata items, wherein the one or more priority variables are calculated from metadata items of the first set of metadata items and metadata items of the second set of metadata items;
performing an analysis of the one or more priority variables; and
determining the priority values of the metadata items of the first set of metadata items based on results of the analysis of the one or more priority variables.

In order to prioritize the metadata, priority variables are used. These priority variables are calculated from the different types of metadata and/or from relationships between the types of metadata. Once the priority variables have been determined, they are analyzed to automatically classify the metadata items into different categories, e.g. important and non-important. The final priority value for each metadata is thus represented by a flag, i.e. essentially by an integer value.

SUMMARY OF THE INVENTION

It is an object of the present invention to propose an improved solution for prioritizing metadata, which is suitable for complex applications of the prioritized metadata.

According to the invention, a method for prioritizing a metadata item associated to audio or video data comprises the steps of:
retrieving a metadata item;
determining a priority value of the metadata item using one of a plurality of prioritization methods;
storing the priority value in a priority table; and
referencing the priority table in a metadata table.

Accordingly, an apparatus for prioritizing a metadata item associated to audio or video data comprises:
a metadata collector or extractor for retrieving a metadata item from a metadata repository or via an input;
an analyzing unit for determining a priority value of the metadata item using one of a plurality of prioritization methods; and
a storing unit for storing the priority value in a priority table, and for referencing the priority table in a metadata table.

It has been found that a simple integer as priority value restricts the application of complex scenarios for metadata prioritization. Therefore, according to the invention the prioritization results are represented by a priority table, e.g. an SQL database table. Such a table enables much more complex metadata prioritization applications. For example, different metadata prioritization methods may be applied to the same metadata item, which may result in different priority values. Using a single priority value as proposed in the prior art would require the developer to select a "best" priority value from the multiple results obtained in the processing stage of metadata prioritization. As a result all other priority values for a metadata item would be lost. The solution according to the invention preserves all determined priority values for future applications.

As a further advantage, the solution according to the invention allows storing additional information for the priority values.

To give an example, the additional information may include the total number of prioritization methods applied to a metadata item or priority values available for a metadata item, a preferred priority value set by the developer or a user, information whether the preferred priority value is an original or post-edited value, etc.

Preferably, a priority detail table is generated and stored, which comprises information about the used prioritization method. This has the advantage that it is documented how a specific priority value was actually determined.

According to another aspect of the invention, a method for annotating audio or video data comprises the steps of:
- retrieving a set of metadata items associated to the audio or video data from a metadata repository;
- determining priority values for the metadata items of the retrieved set of metadata items;
- determining a subset of metadata items from the retrieved set of metadata items based on the determined priority values;
- presenting at least a part of the audio or video data and the subset of metadata items to a user;
- receiving a user input for modifying one or more metadata items or priority values of the presented subset of metadata items; and
- storing the modified one or more metadata items or priority values.

Accordingly, an apparatus for annotating audio or video data comprises:
- a metadata collector or extractor for retrieving a set of metadata items associated to the audio or video data from a metadata repository;
- an analyzing unit for determining priority values for the metadata items of the retrieved set of metadata items and for determining a subset of metadata items from the retrieved set of metadata items based on the determined priority values;
- a display for presenting at least a part of the audio or video data and the subset of metadata items to a user;
- a user interface for receiving a user input for modifying one or more metadata items or priority values of the presented subset of metadata items; and
- a storing unit for storing the modified one or more metadata items or priority values.

The solution has the advantage that only a subset of the metadata items is presented to the user, e.g. on a display graphical user interface. This subset advantageously comprises only the most relevant metadata items, i.e. those metadata items with the highest priority value. This greatly increases the efficiency of a manual annotation of the audio or video data. For determining the priority values either one of a plurality of prioritization methods is used or previously determined priority tables with priority values are retrieved from the metadata repository.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

FIG. 1 shows an exemplary metadata prioritization result in the form of a segment table, FIG. 2 illustrates a modification of the segment table of FIG. 1, which includes a pointer to a priority table of a metadata item, FIG. 3 shows an exemplary priority table of a prioritized metadata item, FIG. 4 depicts a priority detail table referenced by an identifier in the priority table.

DETAILED DESCRIPTION OF PREFERRED EMBODIMENTS

Figure 5:
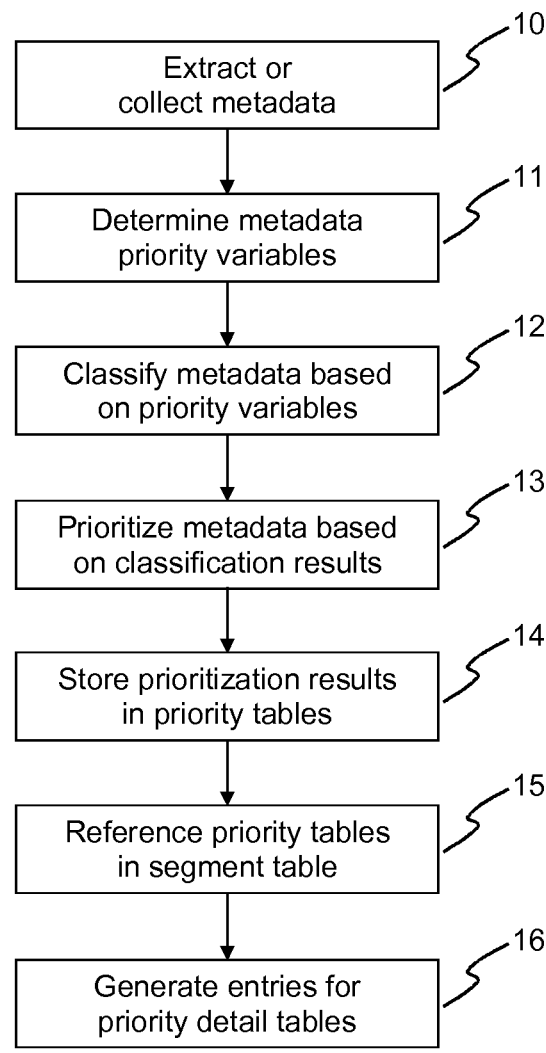
FIG. 5 illustrates a method according to the general idea of the invention, FIG. 6 schematically illustrates an apparatus adapted to perform the method of FIG. 5.

In the following the invention shall be explained for metadata extracted from video data. Of course, the invention is not limited to this type of data. It can likewise be applied to audio data or other types of data, e.g. text data.

During an automatic metadata extraction from video data, a plurality of types of metadata are generated. A first type of metadata is temporal segmentation metadata, which is based on the detection of scenes, shots, sub-shots, and the like. A second type of metadata is spatial segmentation metadata, which is obtained, for example, by face detection or face group segmentation, or more generally by object detection. Another type of metadata is quality metadata, such as contrast, brightness, sharpness, information about blocking artifacts and compression artifacts, overall-quality, or noise. Impairment metadata gives information about dropouts, dirt, and scratches, etc. Finally, semantic metadata includes, inter alia, text-annotations, subtitles and the genre of the video data. For developing high performance metadata applications, these metadata are prioritized, as described, for example, in European Patent Application 11306747.4.

An exemplary metadata prioritization result in the form of a segment table is illustrated in FIG. 1. The table includes for each segment a SegmentStart value, a SegmentEnd value, and a SegmentDuration value, which indicate the start time, the end time, and the duration of a segment, respectively. In addition, the table includes for each segment a SegmentPriority, which is a flag that is used as a priority value for prioritized metadata.

In order to enable more complex scenarios for metadata prioritization, according to the invention the segment table of FIG. 1 is modified as illustrated in FIG. 2. The definition of the SegmentPriority value is changed from integer to string. The string value of the SegmentPriority contains a pointer to an associated priority table of the current metadata.

An exemplary priority table of a prioritized metadata item is depicted in FIG. 3. The priority table contains a number of elements or attributes:
1. UUID: This field contains a universal unique identifier of a metadata prioritization processing entry.
2. NumberOfMethods: This field contains the total number of methods used for metadata prioritization processing.
3. MethodsTracking: This field contains a tracking identifier pointing to a related TrackingID field in a priority detail table.

4. DefaultPriority: This field contains an identifier pointing to an associated UUID entry in the priority detail table. This attribute enables the developer to set a default priority usage.
5. UserPriority: This field contains an identifier pointing to an associated UUID entry in the priority detail table. This attribute enables the user to set a user preferred priority usage.

The above mentioned priority detail table is exemplified in FIG. 4. It preferably contains the following elements or attributes:

1. UUID: This field contains the universal unique identifier for each prioritization processing entry.
2. TrackingID: This entry groups all processing methods that have been applied to the current metadata item.
3. UsedAlgorithm: This identifier points to a UsedAlgorithm table, which contains detail information about the processing methods.
4. ProcessType: This attribute shows if a prioritization processing entry is an original entry or a post-edited entry.
5. PriorityValue: This entry is defined as an integer value. It contains the priority value for a prioritization processing entry.

FIG. 5 illustrates a method according to the general idea of the invention. In a first step 10 metadata are extracted or collected. In the next step 11 metadata priority variables are determined. The metadata priority variables are determined from feature parameters within the metadata types as well as from relationships among the different metadata types. Based on these metadata priority variables the extracted or collected metadata are then classified 12 into different clusters with the help of cluster analysis. The metadata are then prioritized 13 based on the cluster analysis results. Finally, the prioritization results are stored 14 in one or more priority tables and referenced 15 in a metadata table. If not yet available, also entries for one or more priority detail tables are generated 16.

Figure 6:
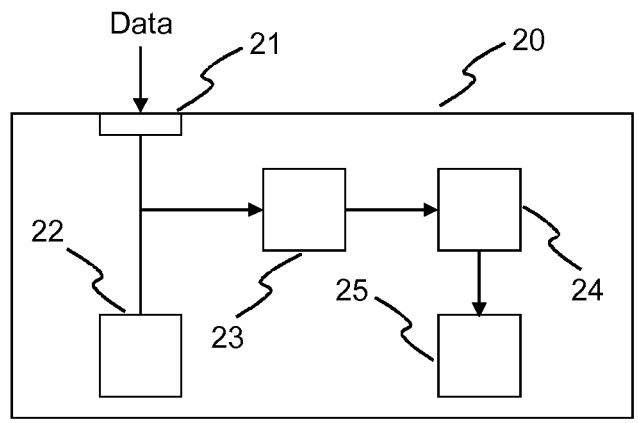

FIG. 6 schematically illustrates an apparatus 20 adapted to perform the method of FIG. 5. The apparatus has an input 21 for receiving data, e.g. audio data, video data, or metadata. Alternatively or in addition, data may be provided from a storage device 22, e.g. a harddisk or a device for playback of removable storage media. A metadata collector or extractor 23 retrieves metadata from the data. The metadata are either already provided together with the data, or they are determined by analyzing the data. The retrieved metadata are provided to an analyzing unit 24, which performs a cluster analysis based on metadata priority variables and prioritizes the metadata based on the cluster analysis results. The prioritization results, i.e. the priority tables, the necessary pointers, and the entries for the priority detail tables, are then output for further processing or stored locally by a storing unit 25. Of course, the metadata collector or extractor 23 and the analyzing unit 24 may likewise be combined into a single processing unit.

In the following an application scenario of the solution according to the present invention shall be discussed.

When the first priority value for a metadata item is generated, a new entry is inserted into the priority detail table of FIG. 4, for example UUID "xx1", TrackingID "UUID-123", ProcessType "original", . . . . Subsequently, a new entry is created in the priority table of FIG. 2, for example UUID "xxxA", NumberOfMethod "1", MethodsTracking "UUID-123" (i.e. the TrackingID value in the priority detail table), . . . . Finally, an identifier string "xxxA", i.e. the associated UUID value from the priority table, is inserted as the element SegmentPriority of the segment table of FIG. 2.

Now, when another metadata prioritization method is used to generate a new priority value for the same metadata item, a further priority value for the same metadata item is added. A new entry is inserted into the priority detail table, for example UUID "xx2", TrackingID "UUID-123", ProcessType "original", . . . . Note that the TrackingID value should be the same as the one for "xx1", because the two entries refer to the same metadata item. Subsequently, the existing entry in the priority table under UUID "xxxA" is updated. Mainly, the NumberOfMethod field is set to the value "2". The MethodsTracking value "UUID-123" remains unchanged. Also, the identifier string "xxxA" in the segment table remains unchanged.

A developer may set a default priority value in the priority detail table, e.g. under UUID "xx3". The corresponding ProcessType in the priority detail table has the value "post-edit". The priority table is updated accordingly. The NumberOfMethod field and the DefaultPriority field are set to the values "3" and "xx3", respectively, where "xx3" is the associated UUID value in the priority detail table.

Also a user may set a user preferred priority value in the priority detail table, e.g. under UUID "xx4". The corresponding ProcessType in the priority detail table has the value "post-edit". The priority table is updated accordingly. The NumberOfMethod field and the UserPriority field are set to the values "4" and "xx4", respectively, where "xx4" is the associated UUID value in the priority detail table.

Figure 7:
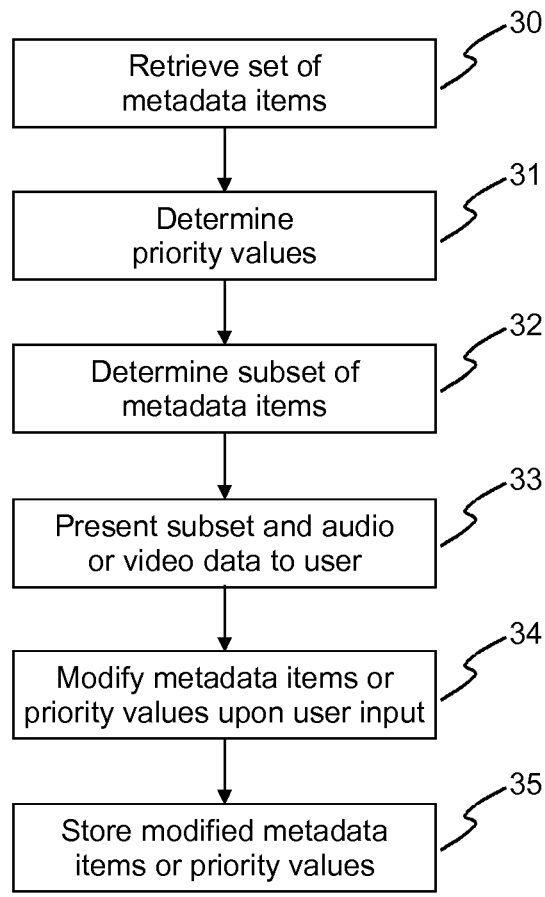
FIG. 7 illustrates a method for annotating audio or video data using prioritized metadata, and FIG. 8 schematically illustrates an apparatus adapted to perform the method of FIGS. 7.

FIG. 7 shows a flowchart of a method for annotating audio or video data using prioritized metadata. A set of metadata items associated to the audio or video data is retrieved 30 from a metadata repository 42. Then priority values are determined 31 for the metadata items of the set of metadata items, e.g. using one of a plurality of prioritization methods or by retrieving priority tables from the metadata repository 42. Based on the determined 31 priority values a subset of metadata items is determined 32 from the set of metadata items. This subset of metadata items and at least a part of the audio or video data are presented 33 to a user. One or more metadata items or priority values of the presented 33 subset of metadata items are modified upon receiving 34 a user input. Finally, the modified one or more metadata items or priority values are stored 35, e.g. in the metadata repository 42.

Figure 8:
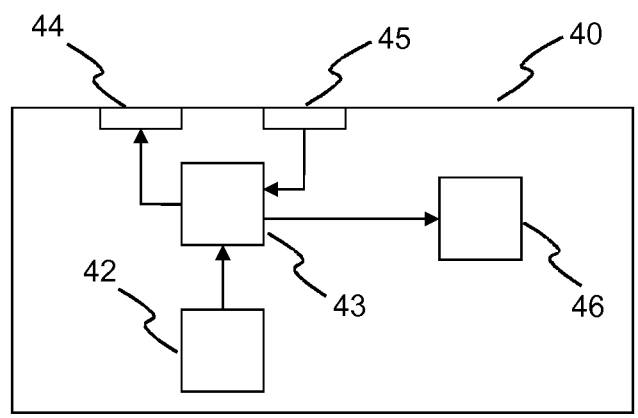

FIG. 8 schematically illustrates an apparatus 40 adapted to perform the method of FIG. 7. The apparatus 40 comprises a metadata collector or extractor 41 for retrieving 30 a set of metadata items associated to the audio or video data from a metadata repository 42. An analyzing unit 43 is adapted to determine 31 priority values for the metadata items of the retrieved 30 set of metadata items and to determine 32 a subset of metadata items from the retrieved 30 set of metadata items based on the determined 31 priority values The apparatus 40 further comprises a display 44 for presenting 33 at least a part of the audio or video data and the subset of metadata items to a user, and a user interface 45 for receiving 34 a user input for modifying one or more metadata items or priority values of the presented 33 subset of metadata items. In order to 35 the modified one or more metadata items or priority values, the apparatus 40 comprises a storing unit 46.

What is claimed is:

1. A method for processing audio or video data, the method comprising:
  retrieving the audio data or the video data;
  processing, with a processing unit, the audio data or the video data to extract a metadata item;
  determining, with the processing unit, a priority value integer of the metadata item using one of a plurality of prioritization methods;
  changing the priority value integer to a priority value string;
  arranging, with the processing unit, the priority value string in a priority table;
  referencing, with the processing unit, the priority table in a metadata table using the priority value string;
  generating, with the processing unit, an entry in a priority detail table comprising information about the used prioritization method and wherein the priority detail table is referenced using a tracking id in the priority table;
  storing, in a storing unit, the priority table, the metadata table, and the priority detail table; and
  processing the audio data or video data according to the stored priority detail table.

2. The method according to claim 1, wherein the priority detail table comprises a default priority.

3. The method according to claim 1, wherein the priority detail table comprises a user-defined priority.

4. An apparatus configured to process audio or video data, the apparatus comprising:
  a processing unit configured to:
    retrieve the audio data or the video data;
    process the audio data or the video data to extract a metadata item;
    determine a priority value integer of the metadata item using one of a plurality of prioritization methods;
    change the priority value integer to a priority value string;
    arrange the priority value string in a priority table;
    reference the priority table in a metadata table using the priority value string;
    generate an entry in a priority detail table comprising information about the used prioritization method and wherein the priority detail table is referenced using a tracking id in the priority table; and
  a storing unit configured to store the priority table, the metadata table, and the priority detail table; and
  wherein the processing unit is further configured to process the audio data or video data according to the stored priority detail table.

5. The apparatus according to claim 4, wherein the priority detail table comprises a default priority.

6. The apparatus according to claim 4, wherein the priority detail table comprises a user-defined priority.

* * * * *